United States Patent [19]
Winkler

[11] 3,880,335
[45] Apr. 29, 1975

[54] TRAILER STORAGE CONTAINER

[76] Inventor: Kurt K. Winkler, 11726 N. County Ln., Mequon, Wis. 53092

[22] Filed: June 29, 1973

[21] Appl. No.: 375,307

[52] U.S. Cl. ...... 224/42.13; 224/42.2; 224/42.42 R; 296/37 R; 296/37.2
[51] Int. Cl. ............................................. B62d 43/00
[58] Field of Search ....... 224/42.13, 42.42 R, 42.11, 224/42.12, 42.14, 42.2, 42.24; 296/37.2, 37 R, 37 A; 280/150 R, 414 R; 220/69, DIG. 13

[56] References Cited
UNITED STATES PATENTS

| | | | |
|---|---|---|---|
| 672,495 | 4/1901 | Smith | 224/32 A |
| 2,445,275 | 7/1948 | Lintern et al. | 280/5 H |
| 3,653,567 | 4/1972 | Selvaggio | 224/42.42 R |

FOREIGN PATENTS OR APPLICATIONS

| | | | |
|---|---|---|---|
| 294,971 | 4/1932 | Italy | 220/DIG. 13 |

Primary Examiner—Robert J. Spar
Assistant Examiner—Jerold M. Forsberg
Attorney, Agent, or Firm—Henry C. Fuller, Jr.

[57] ABSTRACT

A storage container for a trailer such as a boat trailer is provided with two laterally located storage compartments which are spaced to provide a longitudinal channel for receiving the tongue of the trailer. The lateral storage compartments are sized to receive quart oil cans and an upper compartment spanning the two lateral compartments is sized to receive a spare tire for a trailer. The low silhouette of the storage container is such that it easily interfits on the tongue beneath the upturned bow of the boat carried on the trailer. The leading edge of the storage compartment can be rearwardly concave to minimize interference with the towing vehicle.

10 Claims, 4 Drawing Figures

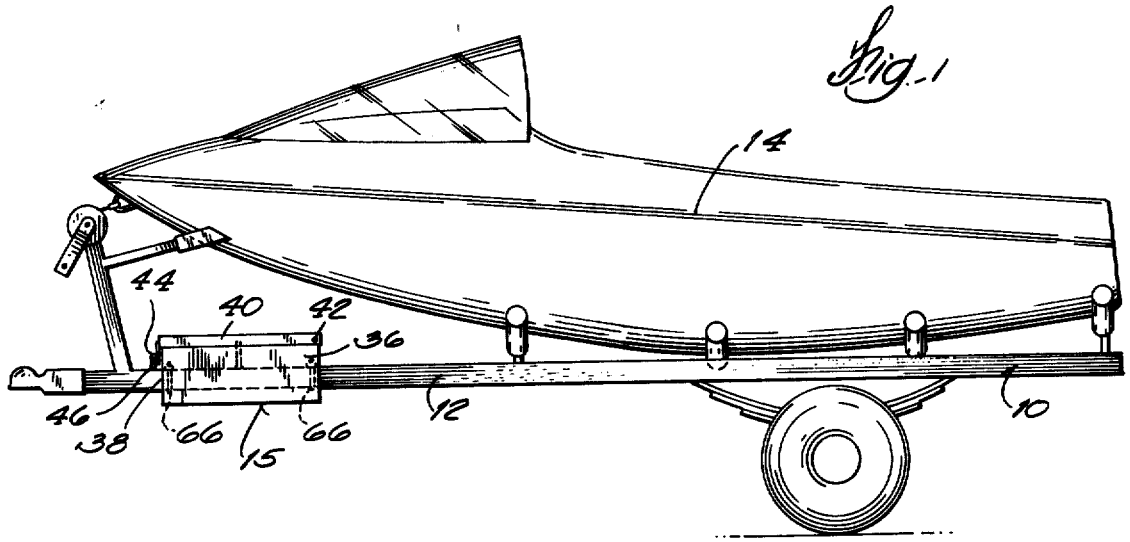
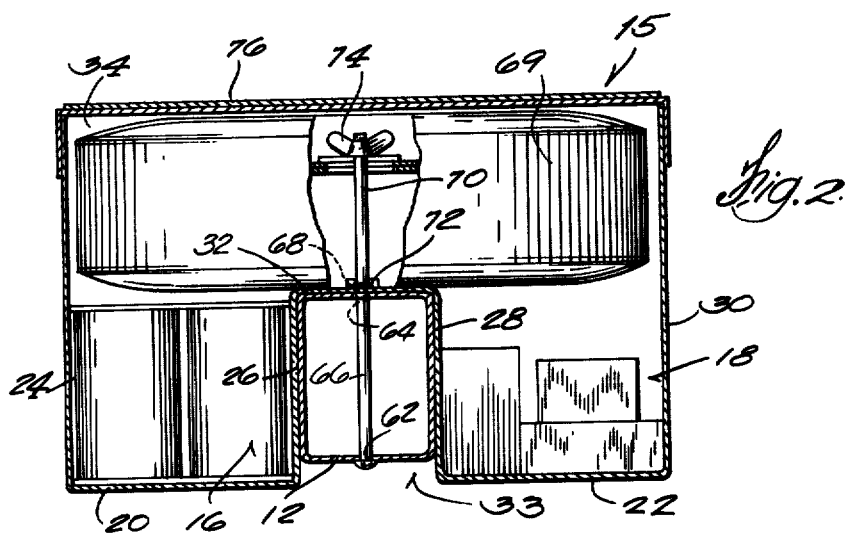
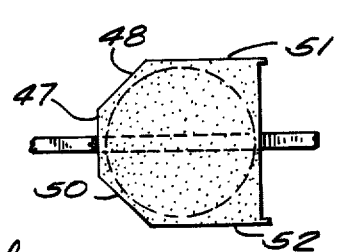
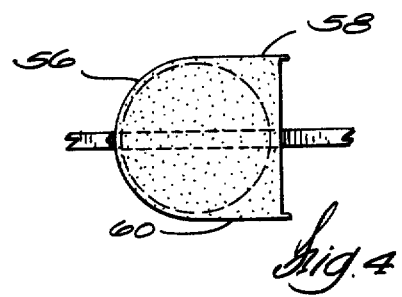

TRAILER STORAGE CONTAINER

SUMMARY OF INVENTION

The invention provides a storage container adapted to interfit on the tongue of a boat trailer and to be located beneath the bow of the boat carried on the trailer. Lateral storage compartments spaced by a channel are of a height such that quart oil cans can be easily located therewithin. An upper storage compartment located above a web which interconnects the lateral storage compartments is sized to receive a spare tire for the trailer. The web portion is provided with apertures, and holes in the tongue permit insertion of bolts, such as carriage bolts, through the tongue and the web with the nuts located within the upper storage compartment. A hinged cover on the upper compartment can be locked to thus prevent access to the container contents and the mounting bolts which secure the container to the trailer tongue.

To minimize interference with the rear of the towing vehicle during turns, the forward edge of the container can be provided with a rearwardly concave surface or rearwardly and outwardly sloping surface.

Further objects, advantages and features of the invention will become apparent from the following disclosure.

DRAWINGS

FIG. 1 is a side elevational view showing a trailer with a storage compartment in accordance with the invention.

FIG. 2 is an enlarged sectional view of the storage container shown in FIG. 1.

FIG. 3 is a modified embodiment with forward surfaces of the container sloped rearwardly and outwardly.

FIG. 4 is a further modified embodiment in which the forward surface of the container is rearwardly concave.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

In the drawings, FIG. 1 shows a boat trailer 10 which includes a tongue 12. The trailer 10 also includes a winch post 13. Supported on the trailer is a boat hull 14. In accordance with the invention, a storage container 15 includes lateral storage compartments 16 and 18 which are defined in part by bottom wall portions 20 and 22, side wall portions 24, 26, 28 and 30. The side wall portions 26 and 28 are spaced by a gap 33 in the form of a longitudinal channel and interconnected by a web portion 32. The gap 33 is of a size adapted to receive the trailer tongue 12.

A third storage compartment 34 is located above the storage compartments 16 and 18 and provides access to the storage compartments 16 and 18. The upper storage compartment is defined by the side walls 24 and 30, a rear or end wall 36 and a forward wall 38. A cover 40 can be hinged to the rear wall 36 at 42 and provided with a hasp 44 for a pad lock 46.

To minimize interference with the towing vehicle, the forward wall can include a wall portion 47 (FIG. 3) with two rearwardly and outwardly extending wall portions 48 and 50 which merge with the side walls 51 and 52.

FIG. 4 shows a further modified embodiment in which the forward wall 56 is rearwardly concave and merges with the side walls 58 and 60.

Means are provided for connecting the storage container to the trailer tongue. In the disclosed construction, the means includes coaxially aligned apertures 62 and 64 in the tongue and one or more carriage bolts or the like 66 which extend through the apertures 62 and 64 in the tongue and through apertures 68 in the web portion 32. With the use of carriage bolts, access to the bolts or nuts for removal of the container from the tongue is afforded only through the interior of the upper compartment. Alternatively, the storage container can be welded to the tongue by welds on the forward or rear edges of the wall portions 26 and 28.

The lateral compartments are sized so that they will receive conventional quart oil cans and the upper compartment is sized to receive an 8 or 12-inch or smaller trailer wheel 69, whichever is appropriate. The trailer wheel can be anchored to the container with a bolt 70 which has a head 72 welded to the web portion. A wing nut 74 secures the wheel 69 in place.

The low profile of the storage container resulting from the use of the longitudinal channel enables positioning of the container beneath the upturned bow. With the hinge for the cover 40 located rearwardly, access to the compartment is possible when the boat is on the trailer.

The cover 40 can also be provided with some form of anti-skid surface such as a rubber mat 76 with ribs or the like. Thus the storage container forms a convenient stand for the person operating the winch when launching or loading the boat.

Although the storage container is appropriate for storing quart oil cans, tools, a trailer jack and spare parts can also be stored.

What is claimed is:

1. In the combination of a trailer having a tongue connectable to a towing vehicle and a winch post including a winch, and a boat hull on the trailer, the improvement comprising a storage container comprising wall means defining a first storage compartment, wall means defining a second storage compartment, a web portion interconnecting said first and second storage compartments, said first and second storage compartments being spaced by a gap to define a longitudinal channel beneath said web portion, said tongue being received in said channel and means connecting said container to said trailer tongue so that said first and second storage compartments are located laterally outwardly of said tongue, wall means located above said first and second storage compartments to define a third storage compartment spanning said longitudinal channel and said first and second storage compartments, a cover for said storage container spanning said storage compartments and having a planar surface providing a pedestal for supporting the operator of the winch to facilitate loading and unloading of said hull, said cover being located rearwardly of said winch post and forwardly of portions of said hull, and said means for connecting said tongue to said storage container also serving to detachably secure a spare wheel within said third container.

2. The combination of claim 1 wherein said cover for said storage container is provided with an anti-skid surface.

3. The combination of claim 1 wherein said third storage compartment is defined in part by wall means common with said wall means defining portions of said first and second storage compartments.

4. The combination of claim 1 wherein said wall means includes an arcuate forward wall which is rearwardly concave to provide clearance with the rear of a towing vehicle.

5. The combination of claim 1 wherein said wall means includes a forward wall portion and side wall portions and wherein said side wall portions have forward edges located rearwardly of said forward wall portion to provide clearance with a towing vehicle.

6. The combination of claim 1 wherein said first and second storage compartments are sized to receive quart oil cans.

7. The combination of claim 1 wherein said third storage compartment is sized to receive a spare tire which spans said first and second compartments.

8. The combination of claim 1 wherein the total height of said first and second compartments and said third compartments exceeds the height of quart oil cans and the thickness of a tire carried in said third compartment.

9. The combination of claim 2 wherein said first and second compartments are upwardly open into said third compartment to afford access to said first and second compartments through said third compartment.

10. The combination of claim 1 wherein said means connecting said container to said tongue comprises apertures in said tongue and said web portion and bolts extending through said tongue and said web.

* * * * *